US006831123B1

(12) United States Patent
Chisholm et al.

(10) Patent No.: US 6,831,123 B1
(45) Date of Patent: Dec. 14, 2004

(54) IONOMERIC POLYESTER COMPOSITIONS CONTAINING ORGANOCLAYS, AND METHOD

(75) Inventors: Bret Ja Chisholm, Clifton Park, NY (US); Farid Fouad Khouri, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/523,669

(22) Filed: Mar. 10, 2000

Related U.S. Application Data (60) Provisional application No. 60/165,710, filed on Nov. 16, 1999.

(51) Int. Cl.[7] .............................. C08J 5/10; C08K 3/34; C08L 31/06
(52) U.S. Cl. ..................... 524/445; 524/442; 524/443; 524/447; 524/448
(58) Field of Search .................................. 524/442, 443, 524/445, 447, 448, 449, 450, 451

(56) References Cited

U.S. PATENT DOCUMENTS

| 5,530,052 A | | 6/1996 | Takekoshi et al. |
| 6,066,694 A | * | 5/2000 | Chisholm et al. ............. 525/67 |

FOREIGN PATENT DOCUMENTS

JP  59-210976  11/1984

* cited by examiner

*Primary Examiner*—James J. Seidleck
*Assistant Examiner*—U. K. Rajguru
(74) *Attorney, Agent, or Firm*—Andrew J. Caruso; Patrick K. Patnode (57) ABSTRACT

Resinous compositions are disclosed which comprise at least one ionomeric polyester and at least one organoclay. Also a method is disclosed for improving the modulus properties of a resinous composition comprising at least one organoclay, the method comprising the steps of combining the resinous composition with at least one ionomeric polyester, and intimately mixing the composition.

48 Claims, 3 Drawing Sheets

FIG. 3 ated with the total number of polymer repeat units present.

IONOMERIC POLYESTER COMPOSITIONS CONTAINING ORGANOCLAYS, AND METHOD

CROSS REFERENCE TO RELATED APPLICATIONS

This application claims the benefit of U.S. Provisional Application No. 60/165,710, filed Nov. 16, 1999, which is incorporated herein by reference.

BACKGROUND OF THE INVENTION

The present invention relates to a composition comprising at least one ionomeric polyester resin and at least one organoclay. The invention also relates to a method for improving modulus properties of a resinous composition containing at least one polyester resin and at least one organoclay.

Organoclays typically consist of particles comprised of several layers of alumino-silicate plates held together by electrostatic interactions with organic moieties containing metal cations or alkyl ammonium ions intercalated between the plates. Such clays have been used as fillers in resinous compositions. In certain cases they may increase properties such as heat resistance, and/or mechanical strength, or they may beneficially decrease properties such as electrical conductivity or permeability to gases such as oxygen or water vapor.

The benefit of organoclays over other mineral fillers in resinous compositions is obtained when the alumino-silicate plates comprising the clay are separated from one another and dispersed in the polymer matrix. Since these plates have a very high aspect ratio, they may provide property enhancement such as reinforcement and improvement in modulus compared to traditional mineral fillers on a per weight of total inorganic content. In order to separate the layers of the clay and obtain maximum reinforcement in a resinous composition, it is typically necessary that polymer adsorb between the layers of the clay causing exfoliation (separation) of the layers. Typically, hydrophilic polymers such as polyamides or water-soluble polymers have been used in compositions with organoclays since they may have an affinity for the clay surface promoting exfoliation. It has been found, however, that intimately mixing typically hydrophobic polyester resins and organoclays does not allow for full exfoliation of the clay. Thus properties of the compositions such as modulus may be only marginally better than those properties obtained when traditional fillers are used in typical polyester resins. There is a need to prepare compositions of normally hydrophobic polyester resins with organoclay fillers which achieve optimum beneficial property improvement.

PCT Patent Application WO 99/32403 suggests the preparation of an expanded organoclay using a sulfonated polyester as an expanding agent. Following the expansion step, the expanded organoclay is combined in a separate step with a non-ionomeric polyester resin to form a composition with up to 30 weight % expanded organoclay, the clay containing 20 to 80 weight % expanding agent.

Japanese Kokai Patent Application No. Hei 10-324810 discloses a resin composite material characterized in that organically modified clay is dispersed in an ionomeric polyolefin resin. However, the use of ionomeric polyesters is not suggested.

BRIEF SUMMARY OF THE INVENTION

The present inventors have now discovered that an organoclay may be effectively dispersed in a polyester resin-containing composition when an ionomeric polyester resin is present. Therefore, in one embodiment the present invention is a composition comprising at least one ionomeric polyester resin and at least one organoclay.

In another embodiment the present invention is a method for improving the modulus properties of a resinous composition comprising at least one organoclay, the method comprising the steps of combining the resinous composition with at least one ionomeric polyester, and intimately mixing the composition.

DETAILED DESCRIPTION OF THE INVENTION

The type of ionomeric polyester resin suitable for use in the compositions of the present invention is not particularly limited, provided that the resin comprises monomer units linked by a plurality of polyester linkages and contains at least 0.05 mole % ionomeric moieties based on the total number of polymer repeat units. In particular, the ionomeric polyester resin may comprise at least one condensation polyester which may be a thermoplastic polyester resin, or thermoplastic elastomeric polyester resin, or liquid crystalline polyester resin. Illustrative, non-limiting examples of thermoplastic polyester resins which may serve as the basis for an ionomeric resin include poly(alkylene dicarboxylate) s, such as poly(ethylene terephthalate), poly(butylene terephthalate) (PBT), poly(1,3-propylene terephthalate), poly(cyclohexanedimethanol terephthalate), poly(cyclohexanedimethanol-co-ethylene terephthalate), poly(ethylene naphthalate), poly(butylene naphthalate), poly(1,4-cyclohexanedimethyl-1,4-cyclohexanedicarboxylate), and polyarylates, including the polyphthalate esters of 2,2-bis(4-hydroxyphenyl)propane (commonly known as bisphenol A polyarylates).

Illustrative, non-limiting examples of thermoplastic elastomeric polyester resins (commonly known as TPE) which may serve as the basis for an ionomeric resin include polyetheresters such as the poly(alkylene terephthalate)s (particularly poly[ethylene terephthalate] and poly[butylene terephthalate]) containing soft-block segments of poly(alkylene oxide), particularly segments of poly(ethylene glycol) and poly(1,4-butylene glycol); and polyesteramides such as those synthesized by the condensation of an aromatic diisocyanate with dicarboxylic acids and a carboxylic acid-terminated polyester or polyether prepolymer.

Illustrative, non-limiting examples of liquid crystalline polyester resins (commonly known as LCP) which may serve as the basis for an ionomeric resin include poly(p-oxybenzoate-co-p-phenyleneisophthalate), poly(oxybenzoate-co-ethyleneterephthalate), poly(4,4-dioxydiphenyl-co-[iso-or terephthalate]), copolymers of hydroxybenzoic acid, iso- and/or terephthalic acid, and 4,4'-dihydroxybiphenyl; copolymers of hydroxybenzoic acid and 2-hydroxy-6-naphthoic acid; copolymers of hydroxybenzoic acid, iso- and/or terephthalic acid, 4,4'-dihydroxybiphenyl, and hydroquinone; and copolymers of hydroxybenzoic acid, iso- and/or terephthalic acid, 4,4'-dihydroxybiphenyl, and 2-hydroxy-6-naphthoic acid. Liquid crystalline polyesters which may serve as the basis for an ionomeric resin are often commercially available, for example under such tradenames as XYDAR (available from Amoco), ZENITE (available from DuPont), VECTRA (available from Ticona), RODRAN (available from Unitika), SIVERAS (available from Toray), SUMIKASUPER (available from Sumitomo Chemical), and NOVACCURATE (available from Mitsubishi).

The ionomeric polyester resin present in the compositions may comprise a sulfonate, phosphonate, or carboxylate salt of the polyester resin. In preferred embodiments the ionomeric species is a sulfonate salt. Suitable sulfonate salt concentrations on ionomeric polyester resins are at least 0.05 mole %, preferably about 0.05–20 mole % and more preferably about 1.0–10 mole % based on the total number of polymer repeat units. For example, if there are 100 repeat units, then there may be preferably about 1–10 units which bear ionomeric functionality.

Suitable counterions for the salts mentioned above include alkali metal cations, particularly lithium, sodium, potassium; alkaline earth cations; aluminum, zinc, copper, manganese, nickel, cobalt, iron, chromium, and other transition metal cations. In addition, ammonium salts represented by the general formula $NH_xR_y^+$ (wherein R is typically an alkyl group and the sum of x and y is 4) can also be used. For most applications zinc or sodium counterions are preferred. In particularly preferred embodiments of the present invention the ionomeric polyester resin is poly(butylene terephthalate) comprising structural units with at least 0.05 mole % sodium sulfonate salt groups based on the total number of polymer repeat units.

Suitable ionomeric polyester resins may be made by methods well-known to those skilled in the art, for example by polymerization of suitable polyester monomers with inclusion of an ionomer-containing monomer or a masked ionomer-containing monomer convertible to an ionomeric species following synthesis of the polyester. Particularly suitable ionomer-containing monomers are sulfonated phthalate esters such as dimethyl-5-sulfo-isophthalate sodium salt. Alternatively, the ionic groups may be introduced into a polyester resin in a post-synthesis process such as electrophilic substitution on an aromatic ring, particularly sulfonation.

The compositions of the present invention may further comprise at least one non-ionomeric polyester resin or polyamide resin. Any non ionomeric polyester resin present may be a thermoplastic polyester resin, or a thermoplastic elastomeric polyester resin, or a liquid crystalline polyester resin, for example of the types described above which could serve as the basis for the at least one ionomeric resin. When a non-ionomeric polyester resin is present, it may comprise either the same type or a different type of polyester resin than the ionomeric polyester resin. For example, a non-ionomeric polyester resin may comprise a thermoplastic poly(alkylene arenedicarboxylate) while the ionomeric polyester resin may comprise an ionomeric elastomeric polyalkylene terephthalate containing soft-block segments of poly(alkylene glycol). In another illustrative example a non-ionomeric polyester resin may comprise a liquid crystalline polyester while the ionomeric polyester resin may comprise an ionomeric thermoplastic polyalkylene terephthalate. When a non-ionomeric polyester resin is present which comprises a different polyester resin than the ionomeric polyester, then the two polyesters are preferably at least partially miscible or compatible. Alternatively, if the two polyesters are incompatible, then they may be chemically or physically compatibilized by known methods.

In preferred embodiments of the present invention both the ionomeric polyester resin and any optional non-ionomeric polyester resin each comprise the same type of polyester resin, and are preferably at least partially miscible or compatible with each other. Within the present context "same type of polyester resin" means that each resin is composed of essentially the same monomer units except that one of the resins contains at least 0.05 mole % ionomeric groups based on the total number of polymer repeat units. In those instances when the ionomeric polyester resin and any optional non-ionomeric polyester resin each comprise the same type of polyester resin but may be incompatible with one another, then they may be chemically or physically compatibilized by known methods. In more preferred embodiments both the ionomeric polyester resin and any optional non-ionomeric polyester resin each comprise the same type of thermoplastic polyester resin. In especially preferred embodiments both the ionomeric polyester resin and any optional non-ionomeric polyester resin comprise poly(alkylene arenedicarboxylates), with poly(ethylene terephthalate) or poly(butylene terephthalate) being especially preferred. In a most preferred embodiment the composition contains an ionomeric poly(butylene terephthalate) and optionally a non-ionomeric poly(butylene terephthalate) compatible with ionomeric poly(butylene terephthalate).

Polyamides suitable for use in the compositions of the present invention may be made by any known method. Suitable polyamides include those of the type prepared by the polymerization of a monoamino-monocarboxylic acid or a lactam thereof having at least 2 carbon atoms between the amino and carboxylic acid group; of substantially equimolar proportions of a diamine which contains at least 2 carbon atoms between the amino groups and a dicarboxylic acid; or of a monoaminocarboxylic acid or a lactam thereof as defined above together with substantially equimolar proportions of a diamine and a dicarboxylic acid. The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned 6-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

Suitable dicarboxylic acids include those which contain an aliphatic or aromatic group containing at least 2 carbon atoms separating the carboxy groups. The aliphatic acids are often preferred; they include sebacic acid, octadecanedioic acid, suberic acid, glutaric acid, pimelic acid and adipic acid.

For most purposes, the preferred polyamides by reason of their availability and particular suitability are poly (hexamethylene adipamide), often known as "polyamide-66" or "Nylon 66", and especially poly(caprolactam), often known as "polyamide-6" or "Nylon 6".

When present in the compositions, any non-ionomeric polyester or polyamide is present at a level of about 1–50%, preferably about 1–30%, and more preferably about 1–15% by weight based on the weight of the total composition.

The compositions of the present invention contain at least one organoclay. As used herein, "organoclay" comprises a layered clay, usually a silicate clay, typically derived from a layered mineral and in which organic moieties have been chemically incorporated, ordinarily by ion exchange and especially cation exchange with organic-containing ions and/or onium compounds. Illustrative organic ions are mono- and polyammonium cations such as trimethyldodecylammonium and N,N'-didodecylimidazolium.

There is no particular limitation with respect to the layered clays that may be employed in this invention other than that they are capable of undergoing cation exchange with cations and/or onium compounds comprising organic moieties to produce organoclays, and in the form of organoclays they are capable of producing an increase in modulus in a composition containing an ionomeric polyester resin compared to a similar composition containing essentially the same non-ionomeric polyester resin. Illustrative of such layered clays that may be employed in this invention include, for instance, smectite and those of the kaolinite group such as kaolinite, halloysite, dickite, nacrite and the like.

The layered clays are preferably natural or synthetic phyllosilicates, particularly smectic clays. Illustrative examples include, for instance, halloysite, montmorillonite, nontronite, beidellite, saponite, volkonskoite, laponite, sauconite, magadite, kenyaite, bentonite, stevensite, and the like. It is also within the scope of the invention to employ organoclays comprising minerals of the illite group, including hydromicas, phengite, brammallite, glaucomite, celadonite and the like. Often, the preferred layered minerals include those often referred to as 2:1 layered silicate minerals, including muscovite, vermiculite, saponite, hectorite and montmorillonite, the latter often being most preferred. The clays may be synthetically produced, but most often they comprise naturally occurring minerals and are commercially available. Mixtures of clays for example as described above are also suitable. A more detailed description of suitable clays can be found in U.S. Pat. No. 5,530,052, the disclosure of which is incorporated by reference herein.

It is also within the scope of the instant invention to include layered minerals which are classified as layered double hydroxides, as well as layered minerals having little or no charge on their layers provided that they are capable of undergoing cation exchange with cations and/or onium compounds comprising organic moieties to produce organoclays, and in the form of organoclays they are capable of producing an increase in modulus in a composition containing an ionomeric polyester resin compared to a similar composition containing essentially the same non-ionomeric polyester resin.

In addition to the clays mentioned above, admixtures prepared therefrom may also be employed as well as accessory minerals including, for instance, quartz, biotite, limonite, hydrous micas, fluoromicas, feldspar and the like.

Preferred layered clays comprise particles containing a plurality of silicate platelets having a thickness of about 7–15 Å bound together at interlayer spacings of about 4 Å or less, and containing exchangeable cations such as $Na^+$, $Ca^{+2}$, $K^+$, $Al^{+3}$, and/or $Mg^{+2}$ present at the interlayer surfaces. They typically have a cation exchange capacity of about 50–200 milliequivalents per 100 grams.

The layered clay is cation exchanged with organic-containing ions and/or onium compounds to produce organoclay. Suitable organic-containing ions and/or onium compounds include ammonium cations, pyridinium cations, phosphonium cations, or sulfonium cation represented, respectively, by the general formulas $NH_xR_y^+$, $PyR^+$, $PyR^+$, and $SR_2^+$, wherein R is an aromatic group, an alkyl group, an aralkyl group, or a mixture thereof, and the sum of x and y is 4; preferably R is an alkyl group. Other suitable organic-containing ions and/or onium compounds include protonated amino acids and salts thereof containing about 2–30 carbon atoms. Other examples of suitable organic-containing ions and/or onium compounds and processes for employing them are disclosed in U.S. Pat. Nos. 4,810,734; 4,889,885; and 5,530,052 which are incorporated herein by reference.

Suitable specific commercially available or easily prepared organoclays which are illustrative of those which may be employed include CLAYTONE HY, a montmorillonite which has been cation exchanged with dimethyldi (hydrogenated tallow)ammonium ion available from Southern Clay Products, and montmorillonite which has been cation exchanged with such ions as dodecylammonium, trimethyldodecylammonium, N,N'-didodecylimidazolium, N,N'-ditetradecylbenzimidazolium, methyl bis (hydroxyethyl)(hydrogenated tallow)ammonium, or methyl bis(2-hydroxyethyl)octadecylammonium.

The compositions of the invention may also contain conventional additives. Suitable additives include flame retardants, anti-drip agents, stabilizers, resinous impact modifiers, other fillers such as extending fillers, pigments, dyes, antistatic agents, crystallization aids and mold release agents. Since these are well known in the art, they will not be dealt with in detail herein.

A particular advantage of the present invention is that there is no need to pre-swell the organoclay with ionomeric polyester in a separate step prior to intimately mixing with the at least one ionomeric polyester. Polyester compositions comprising ionomeric polyester and organoclay may be prepared by intimately mixing ionomeric polyester, organoclay, and any other blend ingredients. Any intimate mixing process can be used, such as solution blending or preferably melt processing, for example extrusion.

In one embodiment all or a portion of ionomeric polyester, organoclay and any other blend components are fed to the feedthroat of an extruder with optional feeding of a portion of any blend components to at least one feedport downstream of the feed throat. In another embodiment the compositions may be prepared by making a concentrate comprising ionomeric polyester and organoclay, and then intimately mixing the concentrate with any other blend ingredients, such as additional ionomeric polyester and/or at least one non-ionomeric polyester or polyamide. A concentrate may contain about 1–60%, preferably about 5–40% more preferably about 5–30% by weight organoclay.

A concentrate is preferably prepared in a melt processing step such as extrusion. Such an extrusion process may comprise a separate extrusion step in which the concentrate is prepared and isolated, for example as pellets. Alternatively, an extrusion process to make concentrate may comprise throat-feeding of all or a portion of ionomeric polyester and organoclay to prepare concentrate in the front part of an extruder followed by downstream feeding of any other blend ingredients such as additional ionomeric polyester and/or at least one non-ionomeric polyester or polyamide to prepare the final composition in a single extrusion step. Any extrusion process to make compositions of the present invention may optionally comprise one or more vacuum-vented extruder barrel segments, for example to remove any volatile species from the compositions.

In another embodiment the invention is a method for preparing a composition of ionomeric polyester and organoclay which comprises contacting organoclay with at least one ionomeric monomer of an ionomeric polyester, such as dimethyl-5-sulfo-isophthalate sodium salt. Contact may be performed by any convenient method, such as in aqueous suspension, under which conditions the ionomeric monomer may intercalate into the clay. Following removal of water from the composition, the clay-monomer mixture may be treated with other polyester monomers (and optionally more sulfonated monomer) and subjected to polymerization conditions so that ionomeric polyester forms in the presence of the clay. The other polyester monomers may include, but are not limited to, combinations of dimethylisophthalate, dimethylterephthalate, butanediol and ethylene glycol, and preferably the combination of dimethylterephthalate and butanediol. The resulting ionomeric polyester-organoclay composition may be used by itself or as a concentrate for mixing with more ionomeric polyester and/or with optional non-ionomeric polyester or polyamide and any other components, for example as described above.

The final ionomeric polyester- and organoclay-containing compositions of the present invention typically contain about 0.5–25%, preferably about 0.5–15%, more preferably about 0.5–10%, and most preferably about 4–6% organoclay by weight of the total composition.

Still another embodiment of the present invention is a method for improving the modulus properties of a resinous composition comprising at least one organoclay, the method comprising the steps of combining a resinous composition with at least one ionomeric polyester, and intimately mixing the composition. Modulus may be measured by any convenient method, preferably by dynamic mechanical analysis (DMA). Typically, modulus properties in a composition containing ionomeric polyester are improved compared to modulus properties for a similar composition containing essentially the same non-ionomeric polyester.

Yet another embodiment of the invention comprises an article made from a composition comprising at least one ionomeric polyester and at least one organoclay. The article is useful in applications such as packaging, either by itself, for example in film form, or as part of a multilayer structure. Whether used by itself or used as a component of a multilayer structure, the article may possess improved tensile strength and/or modulus and/or improved barrier properties, for example to oxygen and/or carbon dioxide. Depending upon the loading of organoclay and the concentration of ionomeric groups on the polyester among other factors, the articles may be opaque, translucent or substantially transparent.

The various embodiments of the invention are inclusive of simple blends comprising at least one ionomeric polyester resin and at least one organoclay, and also of compositions in which one or more of components has undergone chemical reaction (for example, a redistribution reaction), either by itself or in combination with another blend component, such as optional non-ionomeric polyester or polyamide. When proportions are specified in the compositions, they apply to the originally incorporated materials rather than those remaining after any such reaction.

The invention will be further illustrated by the following examples. In the examples the following resinous components have been used:

Poly(butylene terephthalate) (PBT): VALOX 315 available from General Electric Plastics and having a melt viscosity of 8,500 poise measured at 250° C. and 100 s$^{-1}$ shear rate.

Poly(butylene terephthalate) ionomer (PBT-I): poly (butylene terephthalate) synthesized with the addition of dimethyl-5-sulfo-isophthalate sodium salt monomer to contain either 1, 3, or 5 mole % sodium sulfonate groups based on the total number of polymer repeat units. The materials had melt viscosity similar to that of VALOX 315.

Nylon 6: CAPRON 1250 available from Allied Signal Engineered Plastics.

All resinous components were used in the form of powders. Compositions were prepared by combining the components and intimately mixing by extrusion on a twin screw extruder at a maximum set temperature of 260° C. Dried extrudate pellets were molded into test parts and tested for tensile modulus according to ASTM D638 and for storage modulus by DMA using a Rheometrics Dynamic Spectrometer model 7700 using a torsion rectangular fixture, heating rate of 2° C./minute, and a frequency of 10 radians/second.

EXAMPLES 1–2 AND CONTROL EXAMPLES C1–C7

Compositions were prepared from ionomeric poly (butylene terephthalate) and an organoclay, and tested in comparison to compositions made from ionomeric poly (butylene terephthalate) and a sodium montmorillonite (a non-organoclay; KUNIPIA F available from Kunimine Kogyo K.K., Japan). Test data for both non-ionomeric and ionomeric poly(butylene terephthalate) without any type of clay are also included.

The compositions containing organoclay and ionomeric poly(butylene terephthalate) (Examples 1 and 2) show improved modulus properties compared to the control composition (C3) containing organoclay and essentially the same polyester without ionomeric groups. The compositions containing organoclay and ionomeric poly(butylene terephthalate) (Examples 1 and 2) also show improved modulus properties compared to control compositions lacking organoclay and containing either ionomeric or non-ionomeric poly(butylene terephthalate) (C1, C2, C4, C6, C7).

TABLE 1

|  | C1 | C2 | C3 | C4 | C5 | 1 | C6 | C7 | 2 |
|---|---|---|---|---|---|---|---|---|---|
| PBT | 100 | 95.24 | 95.24 | — | — | — | — | — | — |
| PBT 3% I | — | — | — | 100 | 95.24 | 95.24 | — | — | — |
| PBT 5% I | — | — | — | — | — | — | 100 | 95.24 | 95.24 |
| Clay[a] | — | 4.76 | — | — | 4.76 | — | — | 4.76 | — |
| Organoclay[b] | — | — | 4.76 | — | — | 4.76 | — | — | 4.76 |
| Storage modulus | | | | | | | | | |
| G' at 150° C. (Pa) | 1.00e+08 | 9.91e+07 | 1.24e+08 | 8.47e+07 | 1.00e+08 | 1.60e+08 | 8.27e+07 | 1.10e+08 | 1.56e+08 |
| G' at 200° C. (Pa) | 5.52e+07 | 5.56e+07 | 6.28e+07 | 4.61e+07 | 5.53e+07 | 8.07e+07 | 4.11e+07 | 5.60e+07 | 7.33e+07 |
| % inc. G' at 150° C. | — | — | — | — | — | 29% vs. C3 | — | — | 26% vs. C3 |
| % inc. G' at 200° C. | — | — | — | — | — | 28% vs. C3 | — | — | 17% vs. C3 |
| Tensile modulus | | | | | | | | | |
| T.M. (MPa) | 1165 | 1255 | 1352 | 1138 | 1228 | 1448 | 1083 | 1228 | 1483 |
| % inc. T.M. | — | — | — | — | — | 7.1% vs. C3 | — | — | 10% vs. C3 |

[a]sodium montmorillonite (KUNIPIA F)
[b]organically treated montmorillonite (CLAYTONE HY)
The abbreviation "inc." in the Table stands for "increase".

Figure 1:
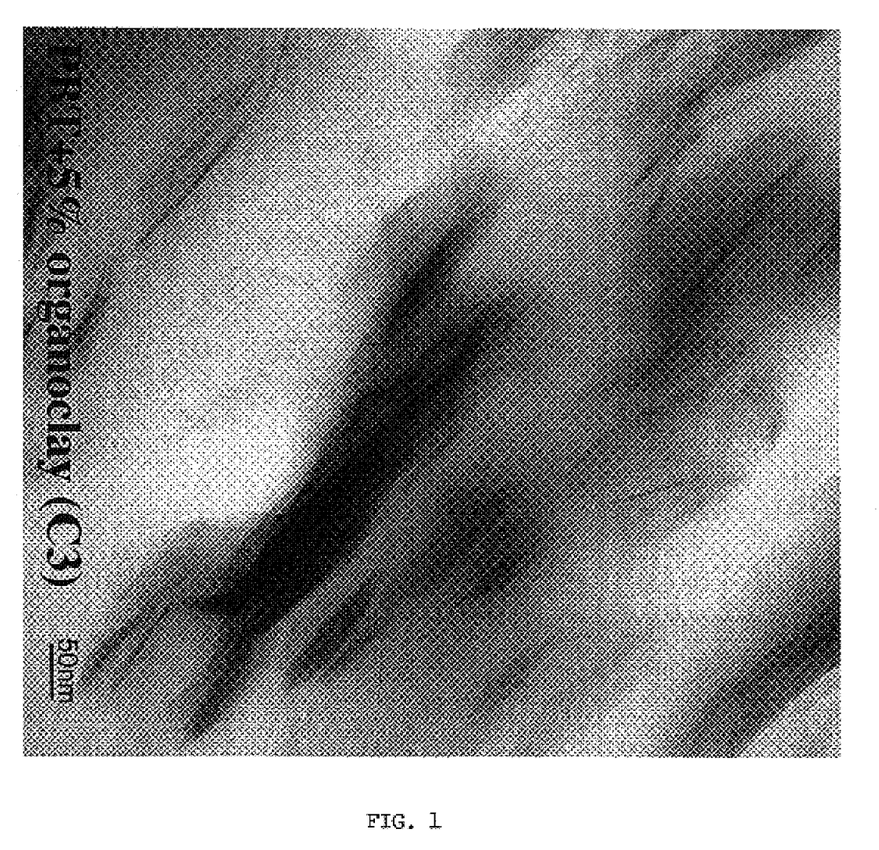
FIG. 1 shows a transmission electron micrograph (TEM) of a control composition containing organoclay and non-ionomeric poly(butylene terephthalate).

FIG. 1 (from Control Example 3) shows a transmission electron micrograph (TEM) of a composition containing organoclay and non-ionomeric poly(butylene terephthalate). The composition has large agglomerations of organoclay comprising many layers stuck together; the clay is not well-distributed in the polyester matrix.

Figure 2:
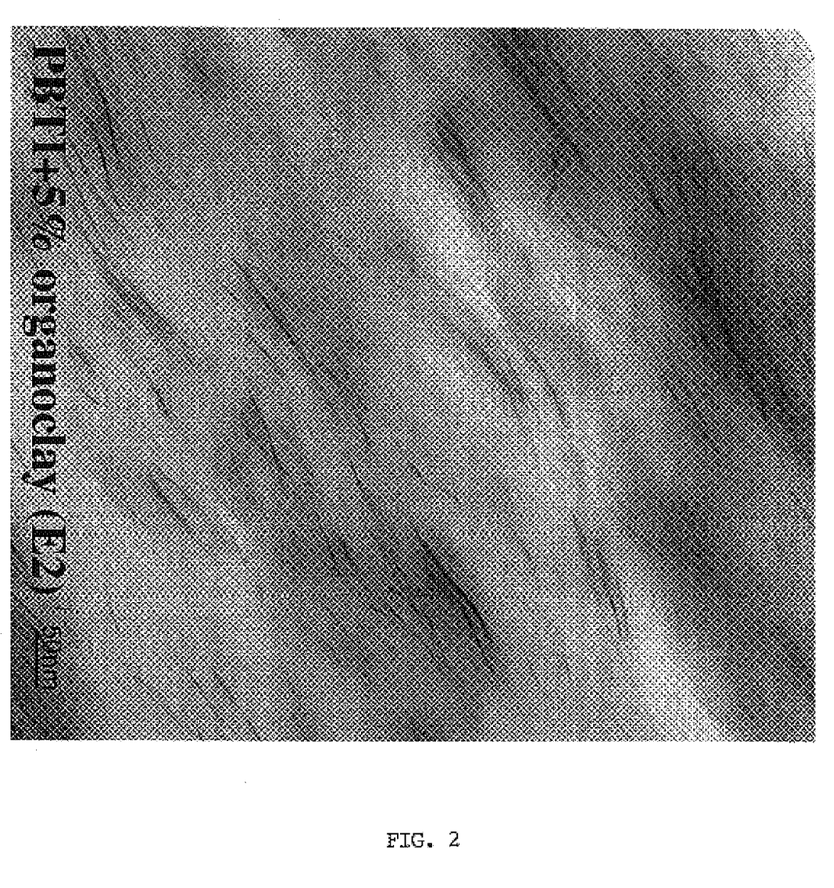
FIG. 2 shows a TEM of a composition of the invention containing organoclay and ionomeric poly(butylene terephthalate).

FIG. 2 (from Example 2 of the invention) shows a TEM of a composition containing organoclay and ionomeric poly (butylene terephthalate). The composition has organoclay particles which have very high aspect ratio compared to those in the control sample (Control Example 3); the particles are very well-distributed in the polyester matrix.

Figure 3:
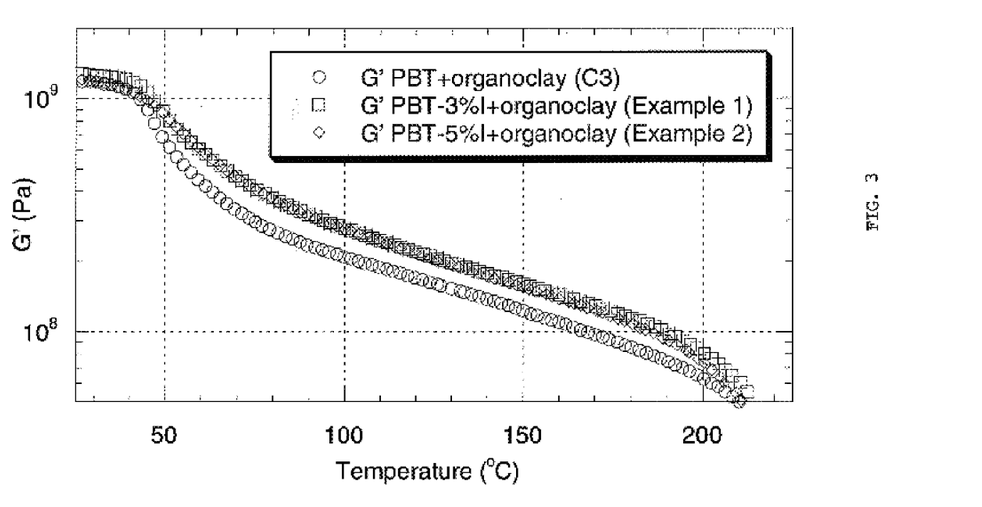
FIG. 3 shows graphs of storage modulus versus temperature for two ionomeric poly(butylene terephthalate)-organoclay compositions containing two different loadings of ionomer groups compared to a graph for a similar composition containing non-ionomeric poly(butylene terephthalate)-organoclay.

FIG. 3 shows graphs of storage modulus versus temperature for two ionomeric poly(butylene terephthalate)-organoclay compositions containing two different loadings of ionomer groups compared to a graph for a similar composition containing non-ionomeric poly(butylene terephthalate)-organoclay. The graph shows the increase in storage modulus obtained using the ionomeric poly(butylene terephthalate)-organoclay combination.

EXAMPLE 3 AND CONTROL EXAMPLES C8–C12

Compositions were prepared from ionomeric poly (butylene terephthalate) and an organoclay, and tested in comparison to compositions made from ionomeric poly (butylene terephthalate) and a surface-treated kaolin (a non-organoclay; TRANSLINK 555, an aminosilane-treated Kaolin available from Engelhard). Test data for the corresponding compositions containing both ionomeric and non-ionomeric poly(butylene terephthalate) are also included. Test data for both non-ionomeric and ionomeric poly (butylene terephthalate) without any type of clay are also included.

The composition containing organoclay and ionomeric poly(butylene terephthalate) (Example 3) shows improved modulus properties compared to the control composition (C12) containing organoclay and essentially the same polyester without ionomeric groups. The composition containing organoclay and ionomeric poly(butylene terephthalate) (Example 3) also shows improved modulus properties compared to control compositions lacking organoclay and containing either ionomeric or non-ionomeric poly(butylene terephthalate) (C8–C11).

TABLE 2

|  | C8 | C9 | C10 | C11 | C12 | 3 |
|---|---|---|---|---|---|---|
| PBT | 100 | — | 95 | — | 95 | — |
| PBT 3% I | — | 100 | — | 95 | — | 95 |
| Kaolin[a] | — | — | 5 | 5 | — | — |
| Organoclay[b] | — | — | — | — | 5 | 5 |
| G' at 150° C. (Pa) | 8.47e+07 | 9.92e+07 | 1.00e+08 | 1.00e+08 | 1.27e+08 | 1.80e+08 |
| G' at 200° C. (Pa) | 4.82e+07 | 5.37e+07 | 5.55e+07 | 5.45e+07 | 6.75e+07 | 9.02e+07 |
| % inc. G' at 150° C. | — | — | — | — | — | 42% vs. C12 |
| % inc. G' at 200° C. | — | — | — | — | — | 34% vs. C12 |
| T.M. (MPa) | 1186 | 1221 | 1276 | 1262 | 1345 | 1483 |
| % inc. T.M. | — | — | — | — | — | 10% vs. C12 |

[a]surface-treated Kaolin (TRANSLINK 555)
[b]organically treated montmorillonite (CLAYTONE HY)
The abbreviation "inc." in the Table stands for "increase".

EXAMPLES 4–7 AND CONTROL EXAMPLES C13–C17

Compositions were prepared from ionomeric poly (butylene terephthalate) and two different organoclays, and tested in comparison to similar compositions made with non-ionomeric poly(butylene terephthalate). Test data for both non-ionomeric and ionomeric poly(butylene terephthalate) without any type of clay are also included.

The compositions containing organoclay and ionomeric poly(butylene terephthalate) show improved modulus properties compared to the control compositions containing organoclay and essentially the same polyester without ionomeric groups (Examples 4 and 5 compared to Control Example C16, and Examples 6 and 7 compared to Control Example C17). The compositions containing organoclay and ionomeric poly(butylene terephthalate) (Examples 4–7) also show improved modulus properties compared to control compositions lacking organoclay and containing either ionomeric or non-ionomeric poly(butylene terephthalate) (C13–C15).

sodium sulfonate groups, 10 parts VALOX 315, and 5 parts CLAYTONE HY. Molded test parts of the composition possess higher modulus than a similar control composition

TABLE 3

|  | C13 | C14 | C15 | C16 | 4 | 5 | C17 | 6 | 7 |
|---|---|---|---|---|---|---|---|---|---|
| PBT | 100 | — | — | 95.24 | — | — | 95.24 | — | — |
| PBT 1% I | — | 100 | — | — | 95.24 | — | — | 95.24 | — |
| PBT 3% I | — | — | 100 | — | — | 95.24 | — | — | 95.24 |
| organoclay[a] | — | — | — | 4.76 | 4.76 | 4.76 | — | — | — |
| SCPX896[b] | — | — | — | — | — | — | 4.76 | 4.76 | 4.76 |
| G' at 150° C. (Pa) | 8.35e+07 | 8.90e+07 | 8.50e+07 | 1.35e+08 | 1.60e+08 | 1.71e+08 | 1.36e+08 | 1.48e+08 | 1.48e+08 |
| G' at 200° C. (Pa) | 4.70e+07 | 5.00e+07 | 4.55e+07 | 6.85e+07 | 8.20e+07 | 7.45e+07 | 6.84e+07 | 7.90e+07 | 7.75e+07 |
| % inc. G' at 150° C. | — | — | — | — | 19% vs. C16 | 27% vs. C16 | — | 8.8% vs. C17 | 8.8% vs. C17 |
| % inc. G' at 200° C. | — | — | — | — | 20% vs. C16 | 8.8% vs. C16 | — | 15% vs. C17 | 13% vs. C17 |
| T.M. (MPa) | 1297 | 1310 | 1310 | 1538 | 1566 | 1593 | 1503 | 1531 | 1531 |
| % inc. T.M. | — | — | — | — | 1.8% vs. C16 | 3.6% vs. C16 | — | 1.8% vs. C17 | 1.8% vs. C17 |

[a]organically treated montmorillonite (CLAYTONE HY)
[b]organically treated montmorillonite (SCPX896) (sodium montmorillonite clay exchanged with methyl bis(hydroxyethyl)(hydrogenated tallow)ammonium salt and supplied by Southern Clay Products)
The abbreviation "inc." in the Table stands for "increase".

EXAMPLE 8 AND CONTROL EXAMPLES C18–C22

Compositions were prepared from ionomeric poly (butylene terephthalate), a polyamide, and an organoclay, and tested in comparison to similar compositions made from non-ionomeric poly(butylene terephthalate).

The composition containing organoclay and ionomeric poly(butylene terephthalate) (Example 8) shows improved modulus properties compared to the control composition (C22) containing organoclay and essentially the same polyester without ionomeric groups. The composition containing organoclay and ionomeric poly(butylene terephthalate) (Example 8) also shows improved modulus properties compared to control compositions lacking organoclay and containing either ionomeric or non-ionomeric poly(butylene terephthalate) (C21 and C20, respectively).

TABLE 4

|  | C18 | C19 | C20 | C21 | C22 | 8 |
|---|---|---|---|---|---|---|
| PBT | — | — | 50 | — | 47.5 | — |
| PBT 3% I | — | — | — | 50 | — | 47.5 |
| Nylon 6 | 100 | 95 | 50 | 50 | 47.5 | 47.5 |
| Organoclay[a] | — | 5 | — | — | 5 | 5 |
| G' at 150° C. (Pa) | 1.31e+08 | 2.21e+08 | 1.11e+08 | 1.12e+08 | 1.71e+08 | 1.89e+08 |
| G' at 200° C. (Pa) | 7.60e+07 | 9.66e+07 | 6.75e+07 | 5.65e+07 | 7.35e+07 | 8.85e+07 |
| % inc. G' at 150° C. | — | — | — | — | — | 11% vs. C22 |
| % inc. G' at 200° C. | — | — | — | — | — | 20% vs. C22 |
| T.M. (MPa) | — | 1469 | 1166 | 1303 | 1476 | 1524 |
| % inc. T.M. | — | — | — | — | — | 3.3% vs. C22 |

[a]organically treated montmorillonite (CLAYTONE HY)
The abbreviation "inc." in the Table stands for "increase".

EXAMPLE 9

A composition is prepared by extruding 90 parts ionomeric poly(butylene terephthalate) containing 3 mole % sodium sulfonate groups, 10 parts VALOX 315, and 5 parts CLAYTONE HY. Molded test parts of the composition possess higher modulus than a similar control composition made without ionomeric poly(butylene terephthalate) (i.e. containing 100 parts VALOX 315 and 5 parts organoclay).

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A composition comprising at least one ionomeric polyester resin and at least one organoclay, wherein the organoclay is not preswollen before combination with ionomeric polyester resin.

2. The composition of claim 1 wherein the ionomeric polyester resin comprises at least one member selected from the group consisting of ionomeric thermoplastic polyester resins, ionomeric thermoplastic elastomeric polyester resins, and ionomeric liquid crystalline polyester resins.

3. The composition of claim 2 wherein the ionomeric polyester resin comprises a sulfonate salt.

4. The composition of claim 3 wherein the sulfonate comprises a salt with sodium.

5. The composition of claim 3 wherein the concentration of sulfonate groups on the ionomeric polyester resin is at least 0.05 mole % based on the total number of polymer repeat units.

6. The composition of claim 5 wherein the concentration of sulfonate groups on the ionomeric polyester resin is in a range of about 1.0–10 mole % based on the total number of polymer repeat units.

7. The composition of claim 2 wherein the ionomeric polyester resin comprises at least one polyester resin selected from the group consisting of poly(alkylene dicarboxylate), poly(ethylene terephthalate), poly(butylene terephthalate), poly(1,3-propylene terephthalate), poly(cyclohexanedimethanol terephthalate), poly(cyclohexanedimethanol-co-ethylene terephthalate), poly(ethylene naphthalate), poly(butylene naphthalate), poly(1,4-cyclohexanedimethyl-1,4-cyclohexanedicarboxylate), polyarylate, polyetherester, and polyesteramide.

8. The composition of claim 7 wherein the ionomeric polyester resin comprises poly(butylene terephthalate).

9. The composition of claim 8 wherein the ionomeric polyester resin consists essentially of a sulfonate salt of poly(butylene terephthalate).

10. The composition of claim 1 wherein the organoclay comprises at least one member selected from the group consisting of kaolinite, halloysite, dickite, nacrite, montmorillonite, nontronite, beidellite, hectorite, saponite, hydromicas, phengite, brammallite, glaucomite, celadonite, kenyaite, magadite, bentonite, stevensite, muscovite, sauconite, vermiculite, volkonskoite, laponite, mica, fluoromica, and smectite.

11. The composition of claim 10 wherein the organoclay comprises at least one montmorillonite in which organic moieties have been incorporated by cation exchange.

12. The composition of claim 1 wherein the organoclay is present in a range of about 0.5–15% by weight of the total composition.

13. The composition of claim 1 further comprising at least one non-ionomeric resin selected from the group consisting of thermoplastic polyester resins, thermoplastic elastomeric polyester resins, liquid crystalline polyester resins, and polyamide resins.

14. The composition of claim 13 comprising a non-ionomeric polyester resin which comprises a different type of polyester resin than the ionomeric polyester resin.

15. The composition of claim 13 comprising a non-ionomeric polyester resin which comprises the same type of polyester resin as the ionomeric polyester resin.

16. The composition of claim 15 wherein the non-ionomeric polyester resin and the ionomeric polyester resin are each comprised of a poly(butylene terephthalate).

17. The composition of claim 13 comprising a polyamide resin.

18. A composition consisting essentially of at least one ionomeric polyester resin and at least one organoclay, wherein the organoclay is not preswollen before combination with ionomeric polyester resin.

19. A composition comprising sulfonated poly(butylene terephthalate) containing about 1.0–10 mole % sulfonate groups based on the total number of polymer repeat units and an organoclay consisting of at least one montmorillonite in which organic moieties have been incorporated by cation exchange, the montmorillonite being present in a range of about 0.5–15% by weight of the total composition, wherein the organoclay is not preswollen before combination with ionomeric polyester resin.

20. The composition of claim 19 further comprising non-ionomeric poly(butylene terephthalate).

21. The composition of claim 19 further comprising polyamide-6.

22. A method for improving the modulus properties of a resinous composition comprising at least one organoclay, the method comprising the steps of combining the resinous composition with at least one ionomeric polyester, and intimately mixing the composition, wherein the organoclay is not pre-swollen in a separate step prior to intimately mixing the composition.

23. The method of claim 22 wherein the ionomeric polyester resin comprises at least one member selected from the group consisting of ionomeric thermoplastic polyester resins, ionomeric thermoplastic elastomeric polyester resins, and ionomeric liquid crystalline polyester resins.

24. The method of claim 23 wherein the ionomeric polyester resin comprises a sulfonate salt.

25. The method of claim 24 wherein the sulfonate comprises a salt with sodium.

26. The method of claim 24 wherein the concentration of sulfonate groups on the ionomeric polyester resin is at least 0.05 mole % based on the total number of polymer repeat units.

27. The method of claim 26 wherein the concentration of sulfonate groups on the ionomeric polyester resin is in a range of about 1.0–10 mole % based on the total number of polymer repeat units.

28. The method of claim 23 wherein the ionomeric polyester resin comprises at least one polyester resin selected from the group consisting of poly(alkylene dicarboxylate), poly(ethylene terephthalate), poly(butylene terephthalate), poly(1,3-propylene terephthalate), poly(cyclohexanedimethanol terephthalate), poly(cyclohexanedimethanol-co-ethylene terephthalate), poly(ethylene naphthalate), poly(butylene naphthalate), poly(1,4-cyclohexanedimethyl-1,4-cyclohexanedicarboxylate), polyarylate, polyetherester, and polyesteramide.

29. The method of claim 28 wherein the ionomeric polyester resin comprises poly(butylene terephthalate).

30. The method of claim 29 wherein the ionomeric polyester resin consists essentially of a sulfonate salt of poly(butylene terephthalate).

31. The method of claim 22 wherein the organoclay comprises at least one member selected from the group consisting of kaolinite, halloysite, dickite, nacrite, montmorillonite, nontronite, beidellite, hectorite, saponite, hydromicas, phengite, brammallite, glaucomite, celadonite, kenyaite, magadite, bentonite, stevensite, muscovite, sauconite, vermiculite, volkonskoite, laponite, mica, fluoromica, and smectite.

32. The method of claim 31 wherein the organoclay comprises at least one montmorillonite in which organic moieties have been incorporated by cation exchange.

33. The method of claim 22 wherein the organoclay is present in a range of about 0.5–15% by weight of the total composition.

34. The method of claim 22 further comprising at least one non-ionomeric resin selected from the group consisting of thermoplastic polyester resins, thermoplastic elastomeric polyester resins, liquid crystalline polyester resins, and polyamide resins.

35. The method of claim 34 comprising a non-ionomeric polyester resin which comprises a different type of polyester resin than the ionomeric polyester resin.

36. The method of claim 34 comprising a non-ionomeric polyester resin which comprises the same type of polyester resin as the ionomeric polyester resin.

37. The method of claim 36 wherein the non-ionomeric polyester resin and the ionomeric polyester resin are each comprised of a poly(butylene terephthalate).

38. The method of claim 34 comprising a polyamide resin.

39. A method for improving the modulus properties of a resinous composition comprising at least one montmorillonite present in a range of about 0.5–15% by weight of the total composition, wherein organic moieties have been incorporated into the montmorillonite by cation exchange, the method comprising the steps of combining the resinous composition with at least one sulfonated poly(butylene terephthalate) containing about 1.0–10 mole % sulfonate groups based on the total number of polymer repeat units, and intimately mixing the composition, wherein the montmorillonite is not pre-swollen in a separate step prior to intimately mixing the composition.

40. The method of claim 39 wherein the resinous composition consists essentially of at least one montmorillonite present in a range of about 0.5–15% by weight of the total composition, wherein organic moieties have been incorporated into the montmorillonite by cation exchange, and at least one sulfonated poly(butylene terephthalate) containing about 1.0–10 mole % sulfonate groups based on the total number of polymer repeat units.

41. The method of claim 40 further comprising non-ionomeric poly(butylene terephthalate).

42. The method of claim 40 further comprising polyamide-6.

43. The composition of claim 11 wherein the organic moieties comprise at least one member selected from the group consisting of ammonium cations, pyridinium cations, phosphonium cations, and sulfonium cations represented, respectively, by the general formulas $NH_xR_y^+$, $PyR^+$, $PR_4^+$, and $SR_2^+$, wherein R is an aromatic group, an alkyl group, an aralkyl group, or a mixture thereof, and the sum of x and y is 4.

44. The composition of claim 43 wherein the organic moieties comprise at least one of a protonated amino acid or salt thereof containing about 2–30 carbon atoms; dimethyldi(hydrogenated tallow)ammonium; dodecylammonium, trimethyldodecylammonium, N,N'-didodecylimidazolium, N,N'-ditetradecylbenzimidazolium, methyl bis(hydroxyethyl)(hydrogenated tallow)ammonium; or methyl bis(2-hydroxyethyl)octadecylammonium.

45. The method of claim 32 wherein the organic moieties comprise at least one member selected from the group consisting of ammonium cations, pyridinium cations, phosphonium cations, and sulfonium cations represented, respectively, by the general formulas $NH_xR_y^+$, $PyR^+$, $PR_4^+$, and $SR_2^+$, wherein R is an aromatic group, an alkyl group, an aralkyl group, or a mixture thereof, and the sum of x and y is 4.

46. The method of claim 45 wherein the organic moieties comprise at least one of a protonated amino acid or salt thereof containing about 2–30 carbon atoms; dimethyldi(hydrogenated tallow)ammonium; dodecylammonium, trimethyldodecylammonium, N,N'-didodecylimidazolium, N,N'-ditetradecylbenzimidazolium, methyl bis(hydroxyethyl)(hydrogenated tallow)ammonium, or methyl bis(2-hydroxyethyl)octadecylammonium.

47. A composition comprising at least one ionomeric polyester resin and at least one organoclay, wherein the organoclay is not pre-swollen in a separate step prior to intimately mixing the composition.

48. A composition comprising sulfonated poly(butylene terephthalate) containing about 1.0–10 mole % sulfonate groups based on the total number of polymer repeat units and at least one montmorillonite in which organic moieties have been incorporated by cation exchange, the montmorillonite being present in a range of about 0.5–15% by weight of the total composition, wherein the organoclay is not pre-swollen in a separate step prior to intimately mixing the composition.

* * * * *